(12) United States Patent
Bernart

(10) Patent No.: US 8,844,962 B2
(45) Date of Patent: Sep. 30, 2014

(54) INTEGRATED HITCH STEP

(75) Inventor: Francis Bernart, North Canton, OH (US)

(73) Assignee: Cequent Consumer Products, Inc., Solon, OH (US)

( * ) Notice: Subject to any disclaimer, the term of this patent is extended or adjusted under 35 U.S.C. 154(b) by 358 days.

(21) Appl. No.: 12/152,987

(22) Filed: May 19, 2008

(65) Prior Publication Data

US 2009/0045604 A1   Feb. 19, 2009

Related U.S. Application Data

(60) Provisional application No. 60/930,588, filed on May 17, 2007.

(51) Int. Cl.
| | | |
|---|---|---|
| *B60D 1/58* | (2006.01) | |
| *B60R 3/00* | (2006.01) | |
| *B60R 9/06* | (2006.01) | |

(52) U.S. Cl.
CPC ... *B60D 1/58* (2013.01); *B60R 9/06* (2013.01); *B60R 3/00* (2013.01)
USPC .......................... 280/507; 280/164.1; 280/511

(58) Field of Classification Search
USPC .............. 280/504, 507, 511, 163, 164.1, 166, 280/491.3, 489, 491.1
See application file for complete search history.

(56) References Cited

U.S. PATENT DOCUMENTS

| | | | |
|---|---|---|---|
| 3,394,947 A * | 7/1968 | Strube, Sr. ..................... 280/166 |
| 3,580,613 A | 5/1971 | Northrop | |
| 4,202,562 A | 5/1980 | Sorenson | |
| 5,803,475 A | 9/1998 | Dick | |
| 5,915,714 A * | 6/1999 | Bell et al. .................... 280/456.1 |
| 5,947,506 A * | 9/1999 | Bauer ............................. 280/507 |
| 6,554,311 B1 * | 4/2003 | Blankenship et al. ......... 280/507 |
| 6,682,086 B1 * | 1/2004 | Erickson ........................ 280/166 |
| 6,851,692 B2 | 2/2005 | Mitchell | |
| 6,994,362 B2 * | 2/2006 | Foster ............................ 280/163 |
| 7,081,197 B1 | 7/2006 | Davis | |
| 7,114,736 B2 * | 10/2006 | Stodola et al. ............. 280/164.1 |
| 7,255,362 B2 * | 8/2007 | Smith ......................... 280/490.1 |
| 7,661,693 B1 * | 2/2010 | Lipski ........................ 280/491.5 |
| 2001/0045720 A1 * | 11/2001 | Schlicht ........................ 280/166 |
| 2004/0207224 A1 * | 10/2004 | Miller et al. ..................... 296/21 |
| 2004/0256833 A1 | 12/2004 | Cervenka | |
| 2005/0108909 A1 * | 5/2005 | Andersen ........................ 40/591 |
| 2006/0097480 A1 * | 5/2006 | Hegefeld ....................... 280/477 |
| 2009/0079157 A1 * | 3/2009 | Fratzke ........................... 280/166 |

FOREIGN PATENT DOCUMENTS

GB       2242659       9/1991

* cited by examiner

*Primary Examiner* — Anne Marie Boehler
*Assistant Examiner* — Maurice Williams
(74) *Attorney, Agent, or Firm* — McDonald Hopkins LLC

(57) ABSTRACT

The hitch step assembly has a platform securable to a hitch bar and pivotable from a storage position to a stepping position with respect to the hitch bar. The platform is preferably substantially planar and parallel to the length of the hitch bar at the stepping position. The platform is pivotable to the storage position that exposes a ball mount assembly connected to the hitch bar. Walls extending downward from the platform to substantially enclose the ball mount assembly and prevent its exposure as a trip hazard during use of the hitch step. A locking pin is provided that maintains the platform at the storage position or the stepping position.

28 Claims, 3 Drawing Sheets

INTEGRATED HITCH STEP

CROSS-REFERENCE TO RELATED APPLICATIONS

This application claims benefit from U.S. Provisional Patent Application No. 60/930,588, entitled "Integrated Hitch Step," filed on May 17, 2007, which is hereby incorporated in its entirety by reference.

FIELD OF THE INVENTION

The present invention is generally related to a hitch step and a method for connecting the hitch step to a vehicle. The apparatus may be positioned over a hitch ball of the vehicle and may provide a step for access to the vehicle or other use as will be appreciated by a person of ordinary skill in the art.

BACKGROUND OF THE INVENTION

A towing vehicle typically utilizes a hitch receiver, a hitch bar and a hitch ball assembly to connect the towing vehicle to a towed vehicle, such as a trailer, RV or the like. Typically, the towing vehicle has a cargo area that is located on the top of the towing vehicle, such as on the roof or luggage rack of the towing vehicle where luggage or other items may be stored. Where the towing vehicle is a sports utility vehicle, a van, or a truck, for example, the roof of the towing vehicle is difficult to access due to its height from the ground. As a result, users may attempt to step on the interior of the towing vehicle, such as adjacent to the door openings or hatch opening of the towing vehicle to access the roof or cargo area. However, stepping into the interior of the towing vehicle presents safety concerns as well as exposes the interior of the car to wear and damage. Other users have attempted to use ladders, stools, chairs and other devices to access the cargo area; however, these devices are cumbersome and inconvenient to transport to the destination of the towing vehicle.

To overcome these problems, stepping devices have been secured to the hitch receiver and the hitch bar of towing vehicles. However, these stepping devices have failed to adequately meet the needs of users. One such stepping device is mounted to a towing bar and extends away from the towing bar. These stepping devices have a large opening positioned above the hitch ball to prevent contact with the hitch ball. The large opening allows these stepping device to slip over the hitch ball and connect to the hitch bar. Advantageously, these stepping devices may be connected to the hitch bar without disconnecting the hitch ball. However, these openings expose the hitch ball during use of the stepping devices and, as a result, present a trip hazard. Further, as the hitch ball is exposed, the hitch ball may be damaged when loading and unloading materials, rendering it unable to connect to the hitch bar.

The large opening is usually abutted by a stepping portion that is located on the side of the opening opposite the hitch bar. As a result, the stepping portion of these stepping devices is located an inconvenient and a dangerous distance from the towing vehicle. Specifically, the opening causes the stepping portion of the stepping device to be positioned a distance from the towing vehicle that is at least slightly greater than the distance of the hitch ball from the vehicle. Such a distance from the vehicle creates difficulty in effectively accessing the cargo or roof area of the vehicle.

Other stepping devices are connected to the hitch bar adjacent to the connection area of the hitch ball. As a result, these stepping devices require removal of the hitch ball prior to connection of the stepping device. This is problematic for users as it requires removal of the hitch ball whenever the stepping device is needed. In addition, such stepping devices are incapable of being connected to the hitch bar when the towed vehicle is connected to the towing vehicle. Therefore, these stepping devices are inconvenient to users.

The present invention provides a stepping device capable of curing at least some of these deficiencies. The stepping device of the present invention also provides additional advantages that will be described herein and apparent to those of ordinary skill in the art.

SUMMARY OF THE INVENTION

The hitch step assembly has a platform securable to a hitch bar and pivotable from a storage position to a stepping position with respect to the hitch bar. The platform is preferably substantially planar and parallel to the length of the hitch bar at the stepping position. The platform is pivotable to the storage position that exposes a ball mount assembly connected to the hitch bar. Walls extending downward from the platform to substantially enclose the ball mount assembly and prevent its exposure as a trip hazard during use of the hitch step. A locking pin is provided that maintains the platform at the storage position or the stepping position.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings. It is to be understood that both the foregoing general description and the following detailed description are exemplary and explanatory and are intended to provide further explanation of the invention as claimed.

DETAILED DESCRIPTION OF THE PREFERRED EMBODIMENTS

While the present invention is described with reference to embodiments described herein, it should be clear that the present invention is not limited to such embodiments. Therefore, the description of the embodiments herein is merely illustrative of the present invention and will not limit the scope of the invention as claimed.

Figure 1:
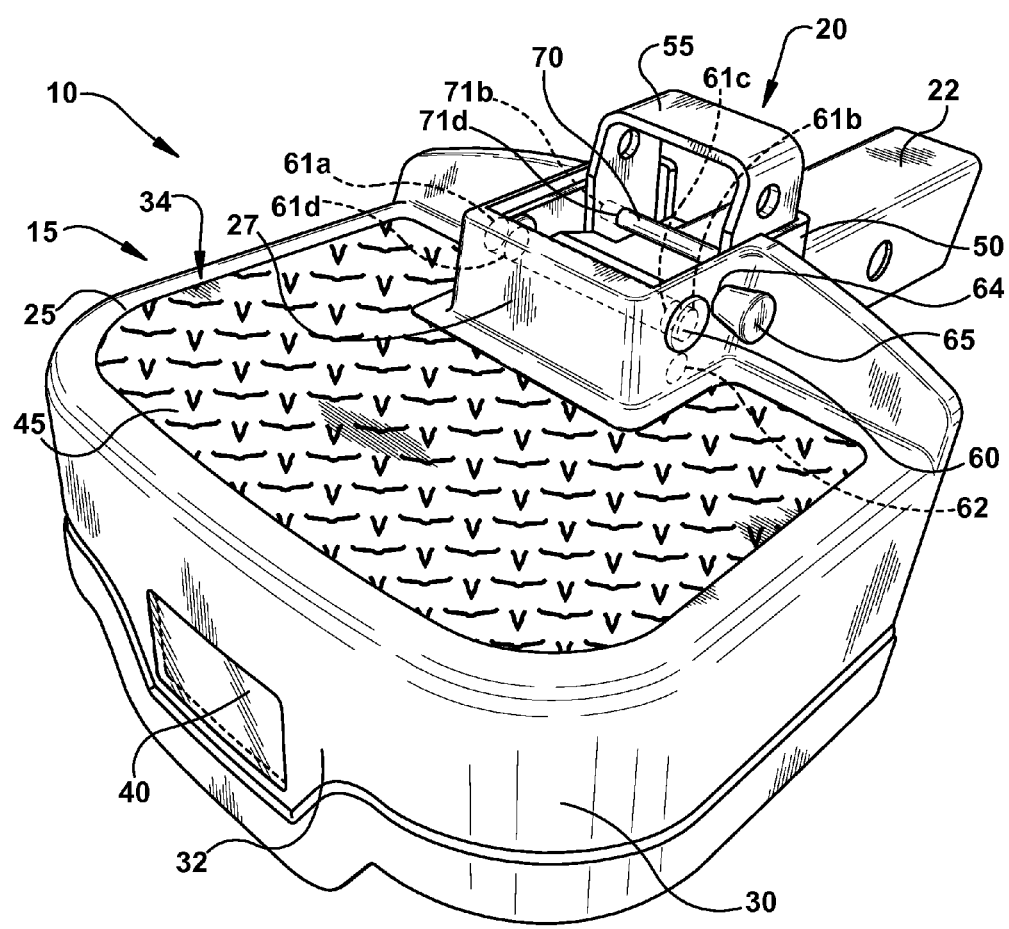
FIG. 1 is a perspective view of a hitch step having a platform in a stepping position in an embodiment of the present invention.
Figure 2:
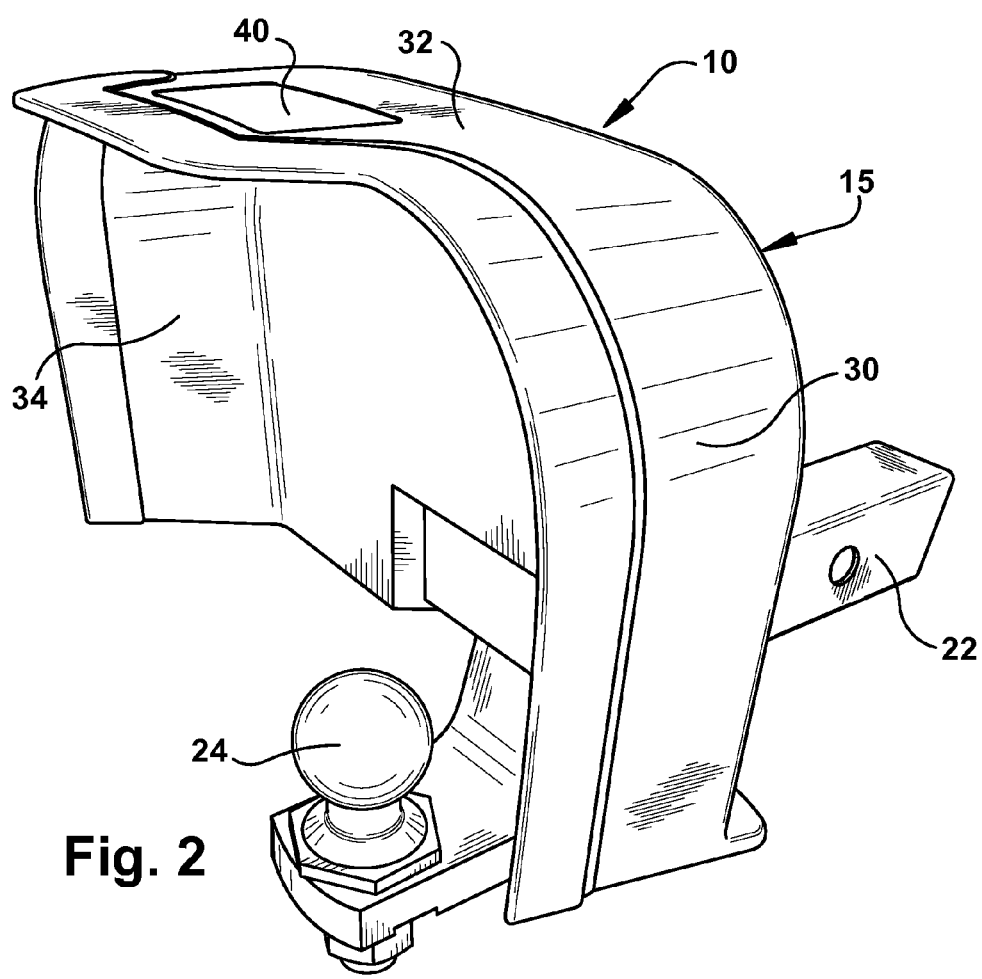
FIG. 2 is a perspective view of a hitch step having a platform in a storage position in an embodiment of the present invention.
Figure 4:
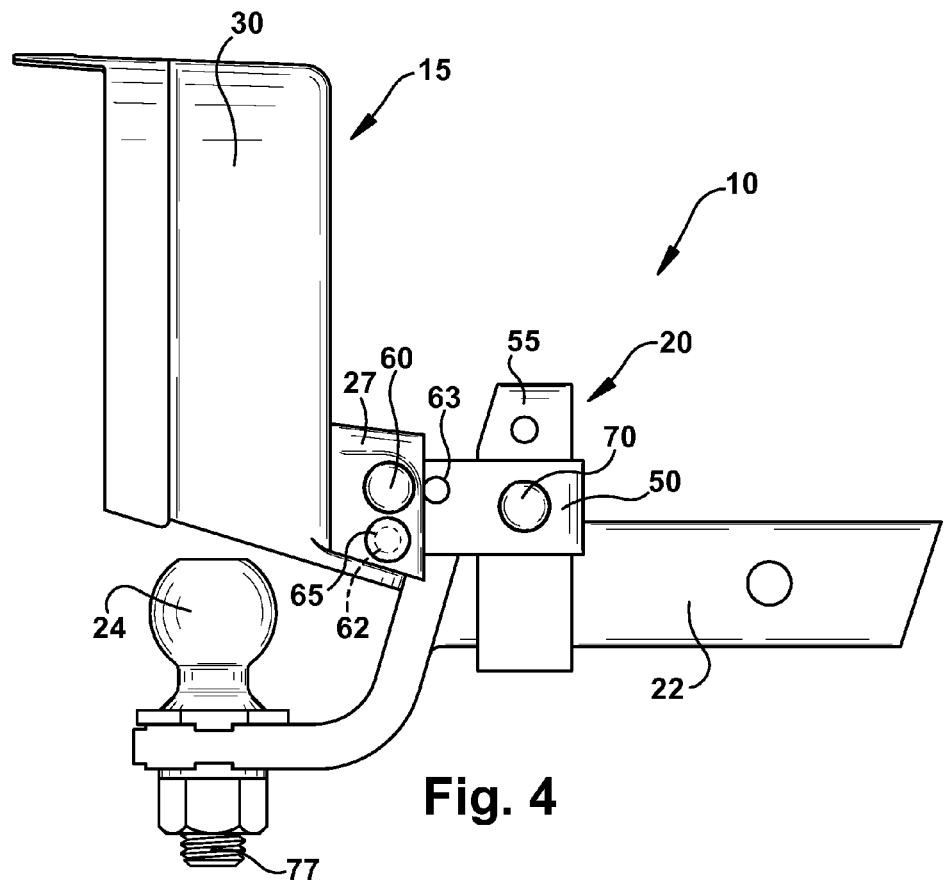
FIG. 4 is a side view of a hitch step having a platform attached to a hitch bar and in a storage position in an embodiment of the present invention.

Referring now to the drawings, and in particular to FIGS. 1 and 2, a hitch step assembly 10 has a hitch step 15 connectable to a hitch bar 22. Typically, the hitch bar 22 is connected to a hitch receiver (not shown), which is attached to a towing vehicle. The hitch bar 22 may, for example, be inserted into the hitch receiver. The hitch bar 22 may extend at a downward angle away from the towing vehicle. A hitch ball mount assembly 24 may be mounted to and secured to the hitch bar 22. The hitch ball mount assembly 24 may be attached at an end of the hitch bar 22 as shown in FIGS. 2 and 4. The hitch ball mount assembly 24 is utilized to secure the towed vehicle to the towing vehicle.

The hitch step 15 has a platform 25 that is capable of supporting a person accessing the cargo area or roof rack of a towing vehicle or otherwise requiring a stepping platform. For example, the platform 25 is preferably substantially planar and sized to permit a user to stand or step with one foot or two feet on the platform 25. In an embodiment, the platform 25 may be sized for two users to stand on opposite ends of the platform 25 so that the cargo or roof area of the towing vehicle may be accessed simultaneously by two users. The present invention should not be deemed as limited to any specific size or shape of the platform 25 as a person of ordinary skill in the art will appreciate different sizes and shapes will be desired by users.

A surface 45 of the platform 25 may be a non-slip surface, a coating, or a treading, such as ribbed or grooved surfaces, diamond-treads, abrasive-grit coatings, buttonholes, serrated diamond-shaped openings, and the like. The surface 45 of the platform 25 may also have drain grooves or apertures to prevent pooling of precipitation or other fluids that may tend to settle on the platform 25.

Walls 30, 32, and 34 may extend from the platform 25. For example, the walls 30, 32, 34 may extend in a downward direction toward the ground when the hitch step 15 is connected to the hitch bar 22. In one embodiment, the walls 30, 32, and 34 may extend beyond the connection of the hitch ball mount assembly 24 to the hitch bar 22. For example, the walls 30, 32, 34 may extend downwardly beyond a threaded portion 77 of the hitch ball mount assembly 24.

Figure 3:
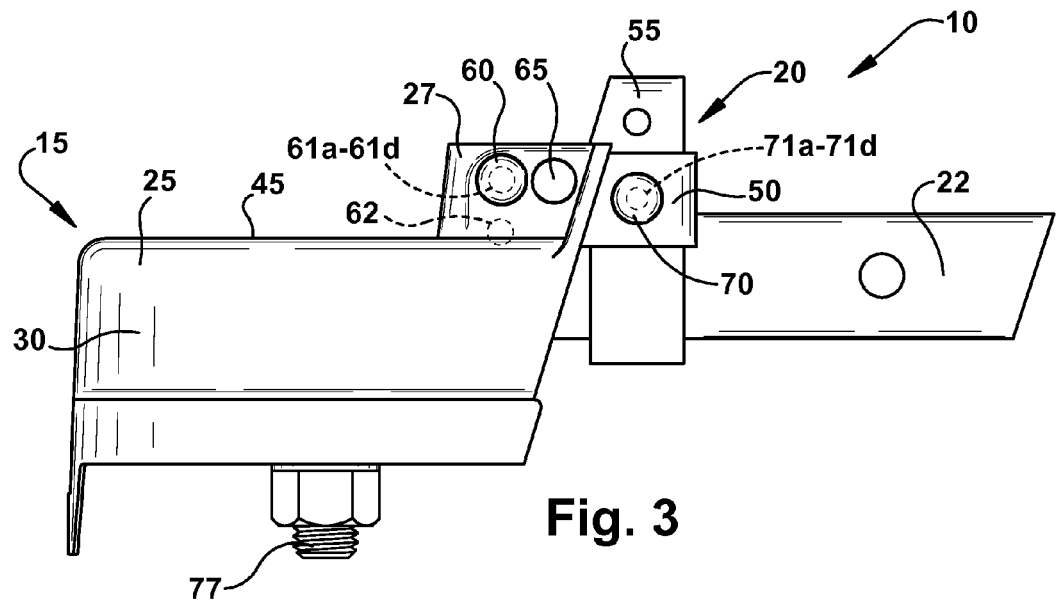
FIG. 3 is a side view of a hitch step having a platform attached to a hitch bar in an embodiment of the present invention.

As shown in FIG. 3, the walls 30, 32, 34 may extend from the platform 25 to surround or enclose the hitch ball mount assembly 24. The walls 30, 32, 34 and the platform 25 may substantially enclose the hitch ball mount assembly 24 to protect the hitch ball mount assembly 24 from damage and/or to allow use of the hitch step assembly 10 without the trip hazard of the hitch ball mount assembly 24.

The walls 30, 32, and 34 may be integrally formed with the platform 25 and may be molded or otherwise constructed as a single unitary member. The walls 30, 32, and 34 may have different lengths. For example, the wall 32 may extend further than the walls 30 and 34. A reflector 40 may be attached to one of the walls 30, 32, 34, such as the wall 32 as shown in FIG. 1. The reflector 40 may aid in signaling to other vehicles that the hitch step 15 is attached to the towing vehicle. Accordingly, the reflector 40 may satisfy local or state regulations regarding devices attached to and/or protruding from vehicles.

In an embodiment, an underside of the platform 25 and the walls 30, 32, 34 may be configured to define a recess capable of receiving the ball mount assembly 24 therein. For example, when the hitch step 15 is positioned in the stepping position (described below) the walls 30, 32, 34 may engage the hitch ball mount assembly 24 within the recess. It is to be understood that the walls 30, 32, 34 may entirely surround the hitch ball mount assembly 24 in such a configuration.

The wall 32 of the hitch step 15 may be hingedly connected to the hitch step 15 to allow the hitch step 15 to be used while a towed vehicle is attached to the towing vehicle via the hitch ball mount assembly 24. For example, the wall 32 may be moved from a vertical position to a horizontal position so that the wall 32 is parallel to the platform 25 and extends outward from the hitch step 15. At the horizontal position, the wall 32 may permit access to the hitch ball mount assembly 24 and allow the connection of a towed vehicle, such as a trailer to the hitch ball mount assembly 24. A locking mechanism may be provided for securing the wall 32 in the horizontal or vertical positions. In an illustrative example, the securing mechanism may be a pin, latch, or the like. Such an embodiment allows connection of the towed vehicle to the hitch ball mount assembly 24 without removing the hitch step 15 from the hitch bar 22.

As shown in FIG. 1, a lip 27 may extend substantially upwardly and away from the platform 25. In an embodiment, the lip 27 may extend substantially perpendicular to the platform 25. The lip 27 may be shaped to correspond to the shape of the hitch bar 22 and may form a substantially u-shape about the hitch bar 22. The lip 27 may be utilized as a kick plate or guard to prevent a user of the hitch step assembly 10 from slipping off the platform 25 while accessing the cargo area or roof rack of the vehicle.

The lip 27 and/or the platform 25 may be attached to a hitch bar 22 of the towing vehicle by a connection member 20. In an embodiment, a portion 29 of the lip 27 may be shaped to receive the connection member 20. As shown in FIG. 3, the connection member 20 is capable of removably securing the hitch step 15 and the platform 25 to the hitch bar 22. In a non-limiting example, the connection member 20 may utilize a first bracket 50 and a second bracket 55. In an embodiment, the second bracket 55 may be secured directly to and abut the hitch bar 22. The first bracket 50 may be secured in a direction generally parallel to the length of the hitch bar 22. The first bracket 50 may be removably secured to the second bracket 55. The second bracket 55 may be secured in a direction generally parallel to the length of the hitch bar 22.

Apertures 71a-71d may extend through the first bracket 50 and the second bracket 55, respectively. The apertures 71a, 71b may extend through the second bracket 55, and the apertures 71c, 71d may extend through the first bracket 50. The apertures 71a, 71c and the apertures 71b, 71d may be coaxially aligned to receive, for example, a pin or a bolt 70 to removably secure the second bracket 55 to the first bracket 50 and the hitch bar 22. The bolt 70 may prevent relative movement between the first bracket 50 and the second bracket 55. The second bracket 55 may be positioned on the outside of the first bracket 50 with respect to the hitch bar 22. The bolt 70 may be extend through the first bracket 50 and the second bracket 55 to maintain the position of the first bracket 50 and the second bracket 55. In an embodiment, the bolt 70 may extend through the hitch bar 22 as well as the first bracket 50 and the second bracket 55.

The first bracket 50 may be provided with one or more apertures 61c, 61d for receiving, for example, a hinge or a bolt 60 to pivotally secure the hitch step 15 to the first bracket 50 and/or the hitch bar 22. The hitch step may have apertures 61a, 61b that coaxially align with the apertures 61c, 61d to receive the bolt 60 therethrough. FIG. 3 illustrates the bolt 60 extending through the lip 27 of the hitch step 15 to secure the hitch step 15 to the first bracket 50. The bolt 60 may be permanently attached to the first bracket 50 or removably attached to the first bracket 50. The hitch step 15 may pivot with respect to the bolt 60 to a horizontal position, a vertical position and any position therebetween. In an embodiment, the bolt 60 may extend through the lip 27, the first bracket 50 and the hitch bar 22. The bolt 60 may engage the hitch step 15 to frictionally maintain the position of the hitch step 15 with respect to the first bracket 50. For example, the mechanical engagement of the bolt 60 with the first bracket 50 and the hitch step 15 may prevent movement of the hitch step 15 without force applied by a user.

As shown in FIGS. 3 and 4, the second bracket 55 may have a first locking aperture 62 and a second locking aperture 63. A locking pin 65 may be inserted or otherwise connected to the locking apertures 62, 63 to secure the hitch step 15 to the hitch bar 22. The hitch step 15 may have a locking aperture 64 for receiving the locking pin 65. The first or second locking aperture 62, 63 of the second bracket 55 may align with the locking aperture 64 of the hitch step 15 to secure the hitch step 15 to the second bracket 55. The shape of the hitch step 15 along with the first bracket 50 and the second bracket 55 allows the hitch step 15 to be secured to the hitch bar 22 without disconnecting the hitch ball mount assembly 24. Although shown as including two brackets, one of ordinary skill in the art will appreciate that the connection member 20 may be provided in a variety of configurations capable of removably securing the hitch step 15 to the hitch bar 22.

In a preferred embodiment, the hitch step 15 is pivotable to at least two positions with respect to the hitch bar 22. For example, the hitch step 15 is pivotable to a storage position as shown in FIGS. 2 and 4 and a stepping position as shown in FIG. 3. The storage position and the stepping position should not be limited to the embodiments shown in FIGS. 2-4. A person of ordinary skill in the art will appreciate that FIGS. 2-4 are merely examples of a storage position and a stepping position.

In a preferred embodiment, the locking pin 65 is inserted through the locking aperture 64 of the hitch step 15 and into the second locking aperture 63 of the first bracket 50 at the stepping position. The locking pin 65 is inserted through the locking aperture 64 of the hitch step 15 and into the first locking aperture 62 of the first bracket 50 at the storage position. Engagement of the locking pin 65 with the apertures 62, 63, 64 may maintain the hitch step 15 at the storage position or the stepping position. One of ordinary skill in the art will appreciate that the hitch step 15 may be positioned at other positions, such as positions between the locking position and the stepping position.

In an embodiment, the storage position is preferably a substantially vertical position but may be any position in which the hitch ball mount assembly 24 is exposed and/or the hitch step 15 is incapable of use. The stepping position is preferably a substantially horizontal position or a position that is substantially parallel to the length of the hitch bar 22. The stepping position may be any position in which a user may access the hitch step 15 and step onto the hitch step 15.

The hitch step 15 may be moved from the storage position to the stepping position by withdrawing the locking pin 65 from the first locking aperture 62, lowering the hitch step 15 to the stepping position, and inserting the locking pin 65 into the second locking aperture 63. In order to raise the hitch step 15 to the storage position from the stepping position, the locking pin 65 is removed from the second locking aperture 63, the hitch step 15 is raised to the storage position, and the locking pin 65 is inserted into the first locking aperture 62.

In an embodiment, the hitch step 15 may have a locking mechanism (not shown) for fixedly securing the hitch step 15 at the stepping position. The locking mechanism may be provided for safety reasons, such as to ensure that the hitch step 15 is maintained at the stepping position during use. The locking mechanism may be provided as a security measure, such as to prevent access to the hitch ball mount assembly 24 or prevent removal of the hitch ball mount assembly 24. For example, the hitch step 15 may be locked at the stepping position to prevent the removal of the hitch ball mount assembly 24. An object, such as a key, may be inserted into the locking mechanism to move the hitch step 15 to the storage position. Therefore, only users with the object may unlock the hitch step 15 to remove the hitch ball mount assembly 24.

The hitch step assembly 10 may be sold to users as a kit that may optionally include the hitch bar 22 and/or the hitch ball mount assembly 24. The kit may include the hitch step 15, the first bracket 50, the second bracket 55, and/or the locking pins 60, 65, and 70. The kit may allow users easy assembly of the hitch step 15 onto any towed vehicle having a hitch receiver.

To assemble the hitch step assembly 10, the first bracket 50 and the second bracket 55 may be positioned on the hitch bar 22. The locking pin 70 may be inserted through the apertures 71a-71d to secure the first bracket 50 and the second bracket 55 to the hitch bar 22. The locking pin 60 may be inserted through the apertures 61a-61d to secure the hitch step 15 to the hitch bar 22 and the first bracket 50. The hitch step 15 may be pivotable about an axis extending through the bolt 60 from the stepping position to the storage position. The locking pin 65 may be engaged with the locking aperture 62 to secure and maintain the hitch step 15 at the storage position. The locking pin 65 may be removed from the locking aperture 62, the hitch step may be lowered to the stepping position, and the locking pin 65 may be inserted into the locking aperture 63 to maintain the hitch step 15 in the stepping position. At the stepping position, the platform 25 and the walls 30, 32, and 34 substantially enclose the hitch ball mount assembly 24. Further, such a configuration prevents the hitch ball mount assembly 24 from presenting a trip hazard while the hitch step 15 is at the stepping position. Accordingly, the hitch step 15 may be used to provide access to vehicle cargo areas and roof racks without necessitating removal of the hitch ball mount assembly 24.

The invention has been described above and, obviously, modifications and alternations will occur to others upon a reading and understanding of this specification. The claims as follows are intended to include all modifications and alterations insofar as they come within the scope of the claims or the equivalent thereof.

Have thus described an embodiment of the invention, the following is claimed:

1. A hitch step assembly for mounting to a hitch bar having a ball mount assembly connectable at an end of the hitch bar, the hitch step assembly comprising:
    a platform securable to the hitch bar and pivotable from a storage position to a stepping position with respect to the hitch bar, the platform is substantially parallel to a length of the hitch bar at the stepping position and is non-parallel to the length of the hitch bar at the storage position, wherein the platform is securable to the hitch bar when the ball mount assembly is directly connected to the hitch bar;
    walls extending downward from the platform to substantially enclose the end of the hitch bar where the ball mount assembly is connectable, wherein the ball mount assembly is substantially enclosed within the hitch step assembly at the stepping position; and
    a locking pin engaging the platform to maintain the platform at the storage position or the stepping position.

2. The hitch step assembly of claim 1 further comprising:
    a first bracket connectable to the platform and the hitch bar, the first bracket connectable to the platform and the hitch bar when the ball mount assembly is directly secured to the hitch bar.

3. The hitch step assembly of claim 2 further comprising:
a second bracket connectable to the platform and the hitch bar, the second bracket connectable to the first bracket and the hitch bar when the ball mount assembly is secured to the hitch bar.

4. The hitch step assembly of claim 3 further comprising:
a first locking aperture in the second bracket; and
a second locking aperture in the second bracket, wherein the locking pin is positioned in the first locking aperture to maintain the platform at the storage position and the second locking aperture to maintain the platform at the stepping position.

5. The hitch step assembly 4 wherein the second bracket is substantially parallel to the length of the hitch bar and the first bracket is substantially perpendicular to the length of the hitch bar.

6. The hitch step assembly of claim 1 wherein the walls and the platform are integrally formed.

7. The hitch step assembly of claim 1 wherein the storage position is substantially perpendicular to the length of the hitch bar.

8. The hitch step assembly of claim 1 wherein the platform is substantially planar and the walls are substantially perpendicular to the platform.

9. The hitch step assembly of claim 8 further comprising a lip extending from the platform and integrally formed with the platform.

10. The hitch step assembly of claim 9 wherein the locking pin engages the lip to maintain the platform at the storage position and the stepping position.

11. A hitch step assembly for mounting to a hitch bar having a ball mount assembly attached to the hitch bar, the hitch step assembly comprising:
a bracket assembly securable to the hitch bar, the bracket assembly having a first locking aperture and a second locking aperture, wherein the bracket assembly is securable to the hitch bar when the ball mount assembly is directly connected to the hitch bar;
a hitch step securable to the bracket assembly, the hitch step having a substantially planar platform capable of supporting weight of a user, the hitch step pivotable with respect to the hitch bar from a storage position to a stepping position; and
a locking pin engageable with the first locking aperture to maintain the platform at the storage position and engageable with the second locking aperture to maintain the platform at the stepping position.

12. The hitch step assembly of claim 11 wherein the platform has a non-slip surface.

13. The hitch step assembly of claim 11 wherein the platform has a single aperture that aligns with the first locking aperture at the storage position and the second locking aperture at the stepping position.

14. The hitch step assembly of claim 11 further comprising:
a pivot pin secured to the hitch step and the bracket assembly, wherein the hitch step pivots about the pivot pin.

15. The hitch step assembly of claim 11 further comprising:
walls extending from the platform, wherein the walls substantially enclose the ball mount assembly at the stepping position and expose the ball mount assembly at the storage position.

16. The hitch step assembly of claim 15 wherein the walls and the platform extend to substantially enclose the ball mount assembly on three sides.

17. The hitch step assembly of claim 11, wherein the bracket assembly includes first and second brackets.

18. The hitch step assembly of claim 17, wherein the first locking aperture is positioned in the second bracket, and the second locking aperture is positioned in the second bracket.

19. A method for securing a hitch step assembly to a hitch bar comprising:
providing a hitch step having a platform that is substantially planar and capable of supporting weight of a user, the hitch step having walls extending from the platform in a direction generally perpendicular to the platform;
connecting the hitch step to the hitch bar with a connecting member, the hitch bar capable of connecting to a hitch receiver of a towing vehicle, wherein the hitch step is pivotable about the connecting member from a storage position to a stepping position, the storage position exposing a ball mount location of the hitch bar, the platform at the stepping position extending from the hitch bar over the ball mount location of the hitch bar, and wherein the hitch step is connectable to the hitch bar when a ball mount is directly secured to the hitch bar at the ball mount location; and
engaging a locking pin into the hitch step to maintain the hitch step at the stepping position or the storage position.

20. The method of claim 19 further comprising:
providing a first bracket and a second bracket having apertures to receive the connecting member; and
securing the first bracket and the second bracket to the hitch bar and the hitch step.

21. The method of claim 19 wherein the walls and the platform substantially enclose the ball mount assembly at the stepping position.

22. The method of claim 19 further comprising:
providing a bracket having at least one aperture to receive the connecting member; and
securing the bracket to the hitch bar and the hitch step.

23. A hitch step assembly for mounting to a hitch bar, the hitch step assembly comprising:
a platform securable to the hitch bar and moveable from a first position to a second position with respect to the hitch bar;
walls extending from the platform, wherein the walls substantially enclose a portion of the hitch bar at the first position and expose the portion of the hitch bar at the second position;
a lock selectively engaging the platform and capable of securing the platform in the first and second positions and the lock preventing movement of the platform with respect to the hitch bar when engaged with the platform, wherein the lock prevents movement of the platform from the first or second positions when a force is applied to the platform toward an opposite position; and
a bracket assembly securable to the hitch bar and securable to the platform, wherein the lock is capable of preventing movement of the platform from the first position and the second position.

24. The hitch assembly of claim 23 wherein the first position is a stepping position wherein an upper surface of the platform is substantially horizontal and the second position is a storage position wherein the upper surface of the platform is non-horizontal.

25. The hitch assembly of claim 24 wherein the bracket assembly includes a first locking aperture and a second locking aperture.

26. The hitch assembly of claim 25 wherein the lock comprises a locking pin insertable in the first locking aperture to maintain the platform at the stepping position and insertable in the second locking aperture to maintain the platform at the storage position.

27. The hitch assembly of claim 26 wherein the platform has a single aperture that aligns with the first locking aperture at the stepping position and the second locking aperture at the storage position.

28. The hitch assembly of claim 25, wherein the bracket assembly includes first and second brackets, whereby the first locking aperture is positioned in either of the first or second brackets, and the second locking aperture is positioned in the second bracket.

* * * * *